(12) United States Patent
Berkovitz

(10) Patent No.: US 10,588,402 B2
(45) Date of Patent: Mar. 17, 2020

(54) PORTABLE COLLAPSIBLE WRITING DESK FOR A NOTEBOOK COMPUTER

(71) Applicant: Arie Berkovitz, Davie, FL (US)

(72) Inventor: Arie Berkovitz, Davie, FL (US)

(\*) Notice: Subject to any disclaimer, the term of this patent is extended or adjusted under 35 U.S.C. 154(b) by 0 days.

(21) Appl. No.: 14/691,451

(22) Filed: Apr. 20, 2015

(65) Prior Publication Data
US 2015/0223599 A1 Aug. 13, 2015

Related U.S. Application Data

(63) Continuation of application No. 12/196,901, filed on Aug. 22, 2008, now Pat. No. 9,027,486.
(Continued)

(51) Int. Cl.
| | |
|---|---|
| *A47B 17/03* | (2006.01) |
| *A47B 5/00* | (2006.01) |
| *B60N 3/00* | (2006.01) |
| *A47B 3/10* | (2006.01) |
| *B60N 3/10* | (2006.01) |

(Continued)

(52) U.S. Cl.
CPC ............. *A47B 17/036* (2013.01); *A47B 3/10* (2013.01); *A47B 5/006* (2013.01); *A47B 17/06* (2013.01); *A47B 21/0371* (2013.01); *A47B 23/046* (2013.01); *B60N 2/79* (2018.02); *B60N 2/793* (2018.02); *B60N 3/002* (2013.01); *B60N 3/101* (2013.01); *A47B 2023/047* (2013.01); *A47C 7/68* (2013.01); *A47C 7/70* (2013.01)

(58) Field of Classification Search
CPC .. A47C 7/68; A47C 7/70; A47B 5/006; A47B 2003/0806; A47B 17/03; A47B 83/02; A47B 23/046; A47B 23/04; A47B 2023/046; A47B 2023/047; A47B 23/007; A47B 17/033; A47B 5/04; A47B 19/08; A47B 17/036; A47B 3/10; A47B 17/06; A47B 21/0371; A47B 1/05; B60N 2/468; B60N 2/4686; B60N 2/79; B60N 2/793; B60N 3/002; B60N 3/101
USPC ....... 248/118.1, 118.3, 157, 460, 461, 284.1, 248/286.1, 458, 447, 454, 279.1, 285.1, 248/447.1, 447.2, 457, 121, 125.8, 161, 248/463, 464; 297/160–162, 145; 108/44, 6–7, 76, 115, 91, 150, 147.2, 108/50.01, 40, 42; 312/282, 313
See application file for complete search history.

(56) References Cited

U.S. PATENT DOCUMENTS 2,489,861 A \* 11/1949 Ciraolo ................. A47B 83/02
297/145
2,518,381 A \* 8/1950 Runkles ................... A47C 7/70
297/145
(Continued)

*Primary Examiner* — Ingrid M Weinhold
(74) *Attorney, Agent, or Firm* — Robert M. Schwartz; Alfred K. Dassler

(57) ABSTRACT

A portable collapsible writing desk for a notebook computer preferably includes an arm rest assembly, a desktop assembly, a column assembly and a base assembly. The base assembly is attached to a bottom of the column assembly. The arm rest assembly is attached to a top of the column assembly. The desktop assembly is moveably retained by the arm rest assembly. The collapsible writing desk may rest on the base assembly, or rest on an end of the desktop assembly and an edge of the column assembly. A retractable handle may be extended to carry the portable collapsible writing desk for a notebook computer like a suitcase.

2 Claims, 22 Drawing Sheets

Related U.S. Application Data

(60) Provisional application No. 60/957,297, filed on Aug. 22, 2007.

(51) Int. Cl.
    *A47B 23/04*     (2006.01)
    *B60N 2/75*     (2018.01)
    *A47B 17/06*     (2006.01)
    *A47B 21/03*     (2006.01)
    *A47C 7/68*     (2006.01)
    *A47C 7/70*     (2006.01)

(56) References Cited

U.S. PATENT DOCUMENTS

| | | | | |
|---|---|---|---|---|
| 3,408,104 | A * | 10/1968 | Raynes | A47C 7/70 297/162 |
| 3,632,161 | A * | 1/1972 | Arfaras | A47C 7/70 297/145 |
| 4,372,604 | A * | 2/1983 | Raksanyi | A47C 7/70 297/145 |
| 4,387,650 | A * | 6/1983 | Pizzi | A47B 17/033 108/39 |
| 4,834,449 | A * | 5/1989 | Engelman | A47B 3/14 108/134 |
| 5,333,929 | A * | 8/1994 | Slagerman | A47C 7/70 297/155 |
| 5,372,403 | A * | 12/1994 | Puerto | A47C 1/03 297/145 |
| 5,927,799 | A * | 7/1999 | Tornero | A47C 7/70 297/145 |
| 6,220,658 | B1 * | 4/2001 | Lukawski | A47C 7/70 297/145 |
| 7,121,518 | B2 * | 10/2006 | Hovde | A47B 97/08 108/38 |
| 2004/0144907 | A1 * | 7/2004 | Hovde | A47B 97/08 248/461 |
| 2004/0207238 | A1 * | 10/2004 | Tornero | A47C 7/70 297/173 |

\* cited by examiner

PORTABLE COLLAPSIBLE WRITING DESK FOR A NOTEBOOK COMPUTER

CROSS REFERENCE TO RELATED APPLICATIONS

This application is a continuation application of U.S. patent application Ser. No. 12/196,901, filed, Aug. 22, 2008, entitled Portable Collapsible Writing Desk For A Notebook Computer, which claims the benefit of U.S. Provisional Application Ser. No. 60/957,297, filed on Aug. 22, 2007, entitled, Portable Desk, the prior applications are herewith incorporated by reference in their entirety.

BACKGROUND OF THE INVENTION

Field of the Invention

The present invention relates generally to portable desks and more particularly to a portable collapsible writing desk for a notebook computer, which can be quickly deployed in several styles and configurations so as to provide a writing surface and/or support for notebook computers.

Description of the Prior Art

Home, educational and professional activities typically associated with notebook computers are widespread. There are times when travelers and students need a writing surface as well as a support surface for a notebook computer. The use of notebook computers in the home or family room requires a temporary support structure to prevent the typical impact damage caused when attempting to use the notebook computer while seated on a sofa or chair. Balancing the notebook computer on your lap or chair arm can result in damaged data drives.

Typical classroom student desks lack portability and are very clumsy to move and store. In most cases, the student desks lack adjustment for height or desktop inclination and generally include small writing surfaces. In most cases, student desk designs predate the existence of notebook computers and thus make no accommodation for notebook computers.

Travelers with notebook computers have very similar needs to that of students. Business travelers with notebook computers have become the most common type of airline passenger. There is a common need for the business professionals to access their notebook computers quickly and momentarily in adverse conditions such as waiting lounges and airport terminals.

Accordingly, there is an established need for a portable collapsible writing desk for a notebook computer, which is portable, versatile, includes a quickly deployable desk surface that can be fully functional as a desktop, yet collapsible to relocate or store as a piece of luggage.

SUMMARY OF THE INVENTION

The present invention is directed to a portable collapsible writing desk for a notebook computer, which functions to overcome the various disadvantages of the fixed student desk style structures.

An object of the present invention is to provide a portable collapsible writing desk for a notebook computer having a base assembly, a column assembly, a desktop assembly and an armrest assembly.

A further object of the present invention is to provide a portable collapsible writing desk for a notebook computer having a deployable carrying handle that allows thereof to be transported like a suitcase.

Another object of the present invention is to provide a portable collapsible writing desk for a notebook that includes a desktop assembly that may be rotated, adjusted for height and adjusted for angular inclination relative to a base assembly through a column assembly.

An additional object of the present invention is to provide a portable collapsible writing desk for a notebook computer that preferably includes at least three control buttons for adjusting the height, rotation and angular inclination of a desktop assembly.

Yet another object of the present invention is to provide a portable collapsible writing desk for a notebook computer that includes an accessory drawer and a notebook battery compartment.

Yet another object of the present invention is to provide a portable collapsible writing desk for a notebook computer that includes a base assembly having a stabilizing member that pivots relative to the base assembly for providing lateral support.

Yet another object of the present invention is to provide a portable collapsible writing desk for a notebook computer that includes a locking mechanism for maintaining a desktop assembly at a particular elevation relative to a base assembly.

Yet another object of the present invention is to provide a portable collapsible writing desk for a notebook computer, which may be used when a user is seated on a sofa, a chair or any other support surface.

With the foregoing and other objects in view there is also provided, in accordance with the invention a portable collapsible writing desk includes a base and an armrest spaced apart from the base. The armrest has a planar surface for supporting a user's arm thereon. A column connects the base to the armrest. A desktop has a vertical desktop extended position, the desktop has a horizontal position with an outer surface of the desktop that defines a desk working surface being substantially level with the planar surface of the armrest. The desktop is linearly slidable along the armrest from the vertical desktop extended position to a desktop nesting position in which the desktop is disposed between the base and the armrest.

With the foregoing and other objects in view there is also provided, in accordance with the invention a portable collapsible writing desk includes a base and an armrest spaced apart from the base. The armrest has a planar surface for supporting a user's arm thereon. A column connects the base to the armrest. The armrest is a cantilever with a first end affixed on the column and a second free end opposite the first end. A desktop has a trailing edge and a leading edge relative to an extension direction of the desktop. The desktop has a vertical desktop extended position in which the trailing edge is extended beyond the second free end of the armrest. The desktop has a horizontal position with an outer surface of the desktop being substantially level with the planar surface of the armrest and the trailing edge adjacent the second free end. The desktop is linearly slidable along the armrest from the vertical desktop extended position to a desktop nesting position in which the desktop is disposed between the base and the armrest with the trailing edge adjacent the column.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

DETAILED DESCRIPTION OF THE PREFERRED EMBODIMENTS

Figure 1:
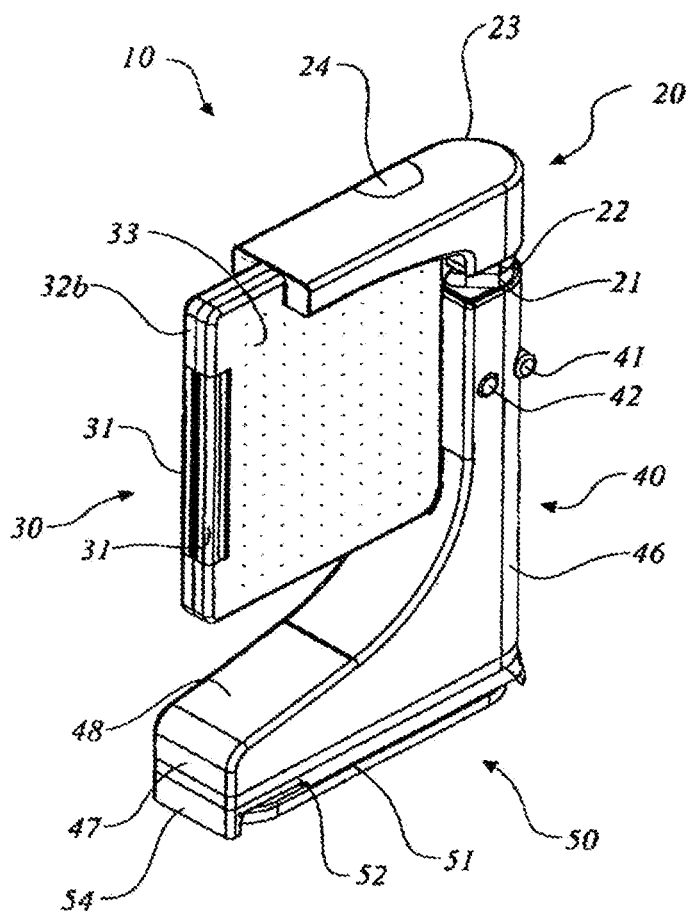
FIG. 1 is a perspective view of a portable collapsible writing desk for a notebook computer.
Figure 2:
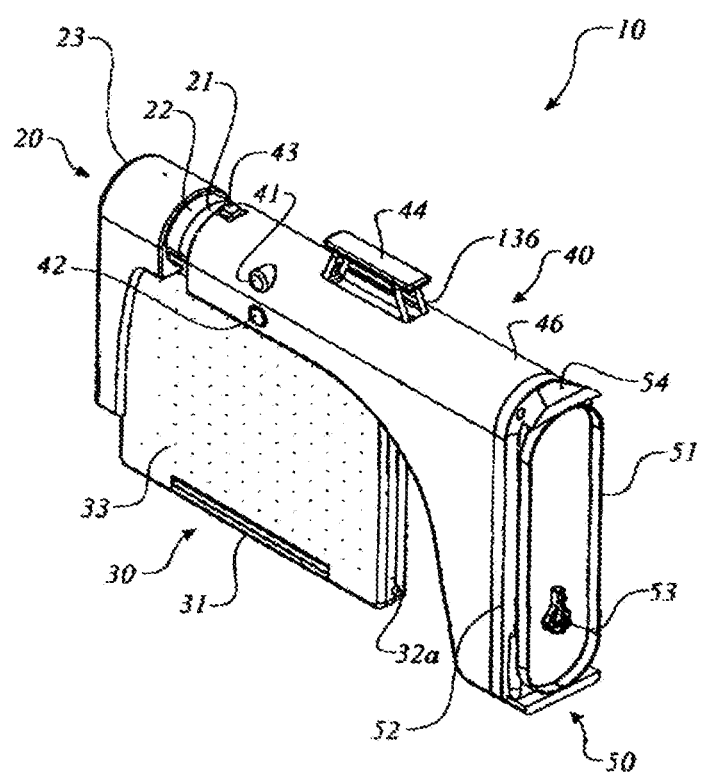
FIG. 2 is a perspective view of a portable collapsible writing desk for a notebook computer in a transportation position.
Figure 3:
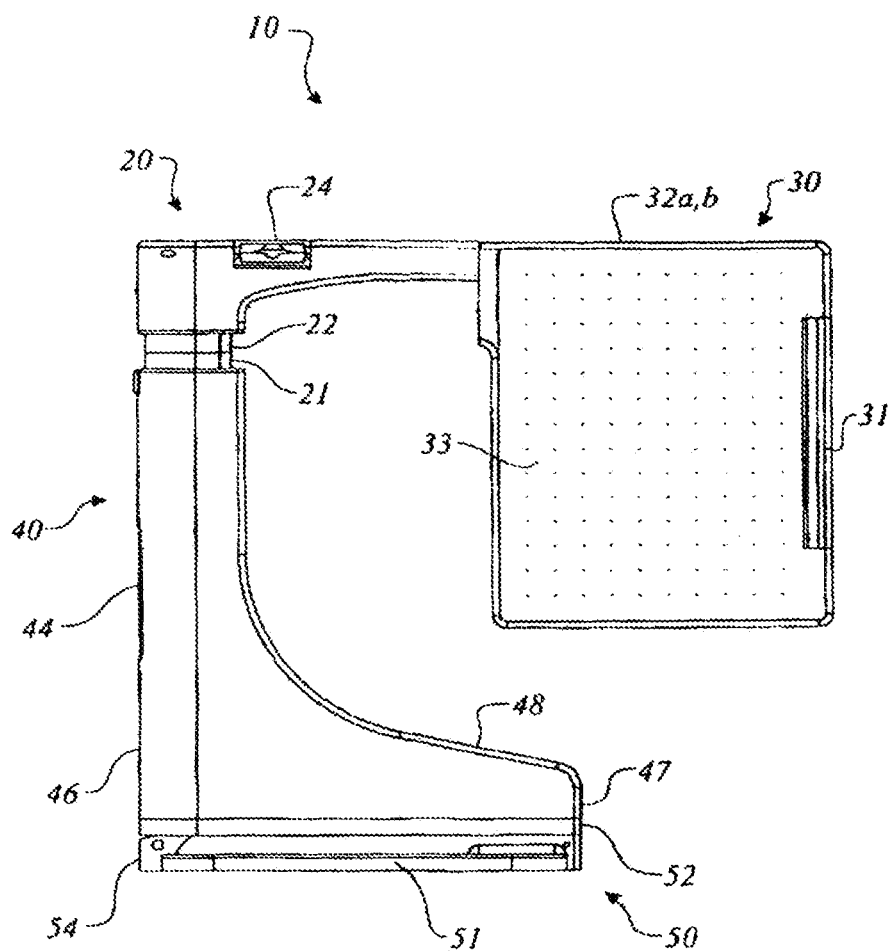
FIG. 3 is a side view of a portable collapsible writing desk for a notebook computer with a desktop assembly in a first stage of deployment.
Figure 4:
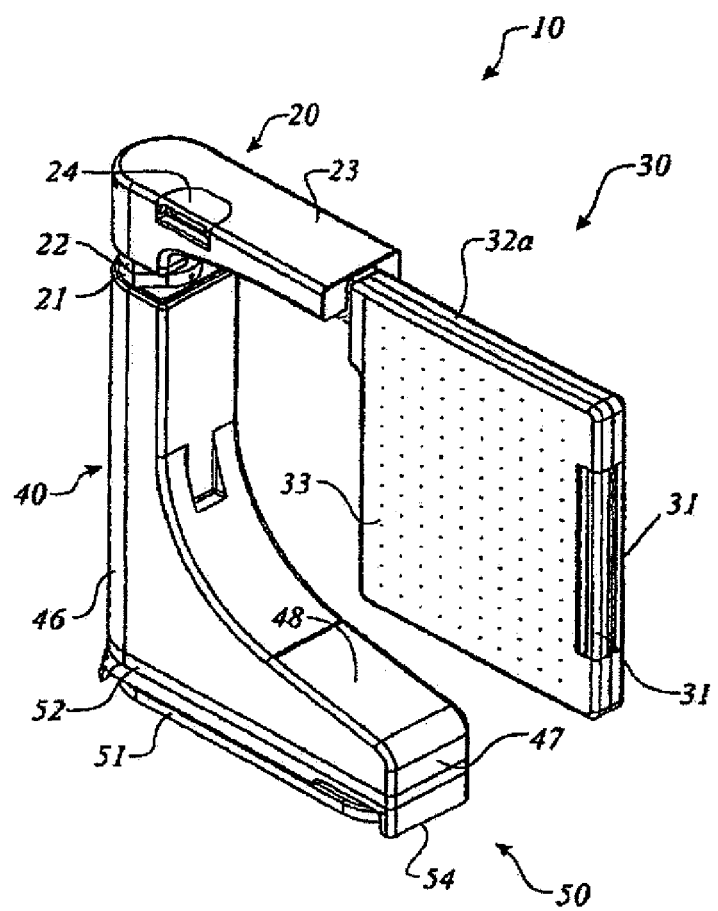
FIG. 4 is a perspective view of a portable collapsible writing desk for a notebook computer in FIG. 3.
Figure 5:
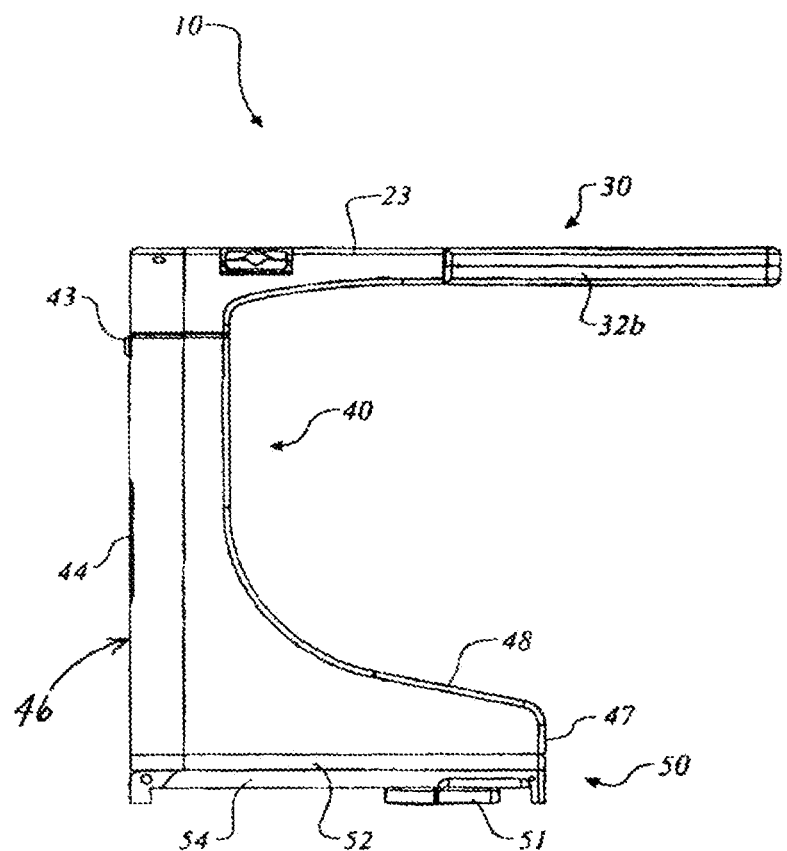
FIG. 5 is a side view of a portable collapsible writing desk for a notebook computer in with a desktop assembly in a final stage of deployment.
Figure 6:
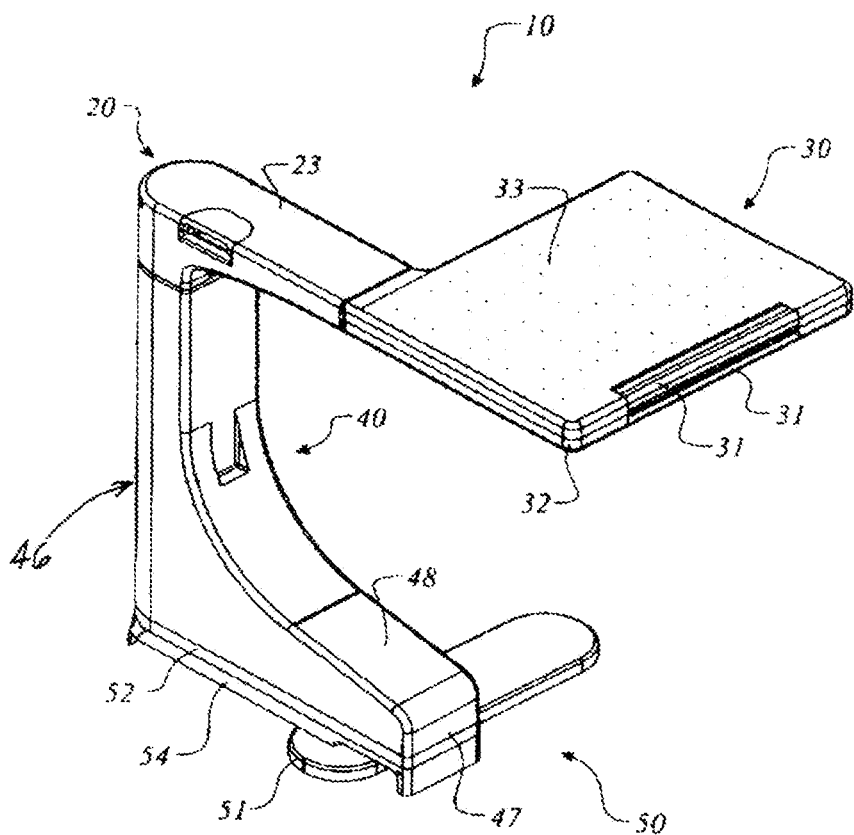
FIG. 6 is a perspective view of a portable collapsible writing desk for a notebook computer in FIG. 5.
Figure 7:
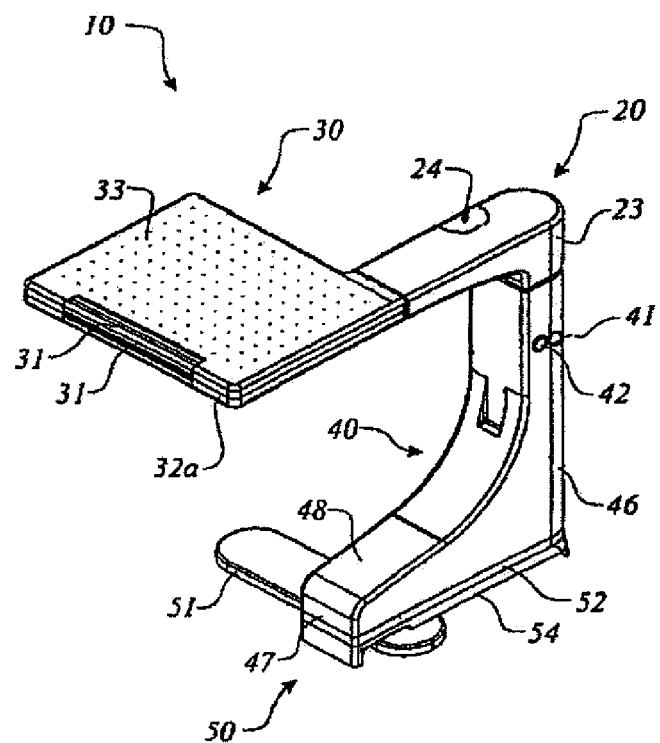
FIG. 7 is a perspective view of a portable collapsible writing desk for a notebook computer with a desktop assembly and a stabilizing member deployed for left hand use.
Figure 8:
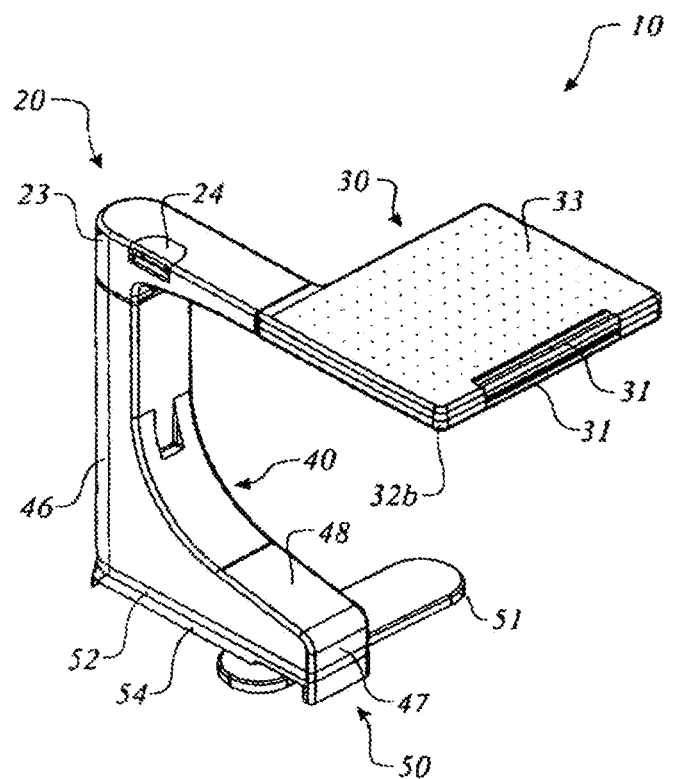
FIG. 8 is a perspective view of a portable collapsible writing desk for a notebook computer with a desktop assembly and a stabilizing member deployed for right hand use.
Figure 9:
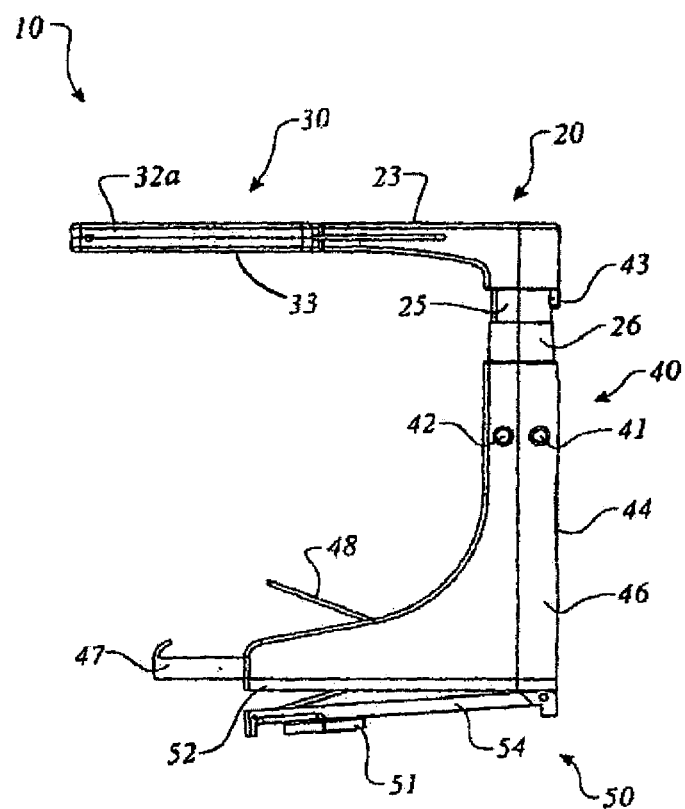
FIG. 9 is a side view of a portable collapsible writing desk for a notebook computer with a desktop assembly and a stabilizing member deployed for right hand use with an accessory drawer and a battery door shown in the open positions.
Figure 10:
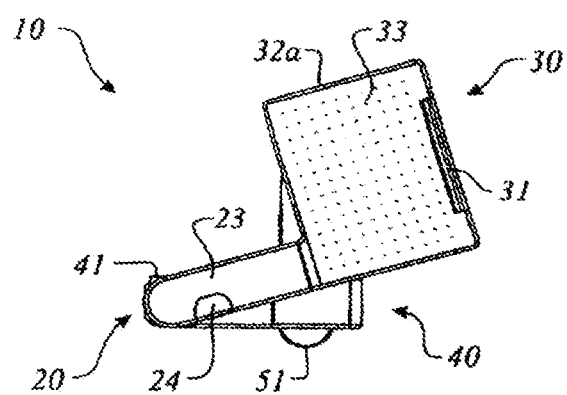
FIG. 10 is a top view of a desk assembly of a portable collapsible writing desk for a notebook computer showing the rotatable feature of the armrest and desk assembly.
Figure 11:
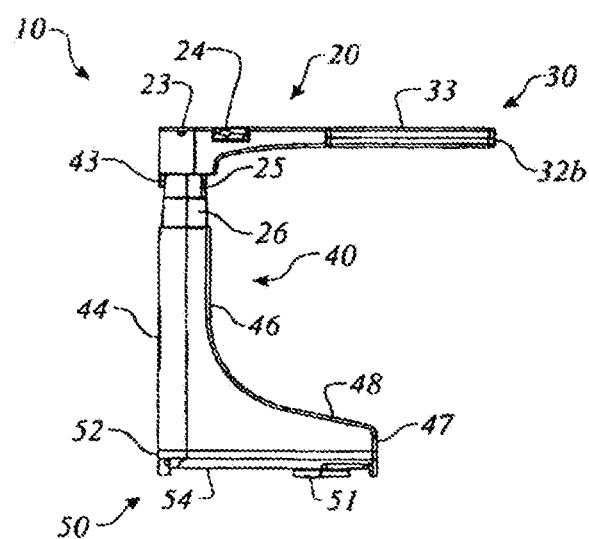
FIG. 11 is a side view of a desk assembly of a portable collapsible writing desk for a notebook computer.
Figure 12:
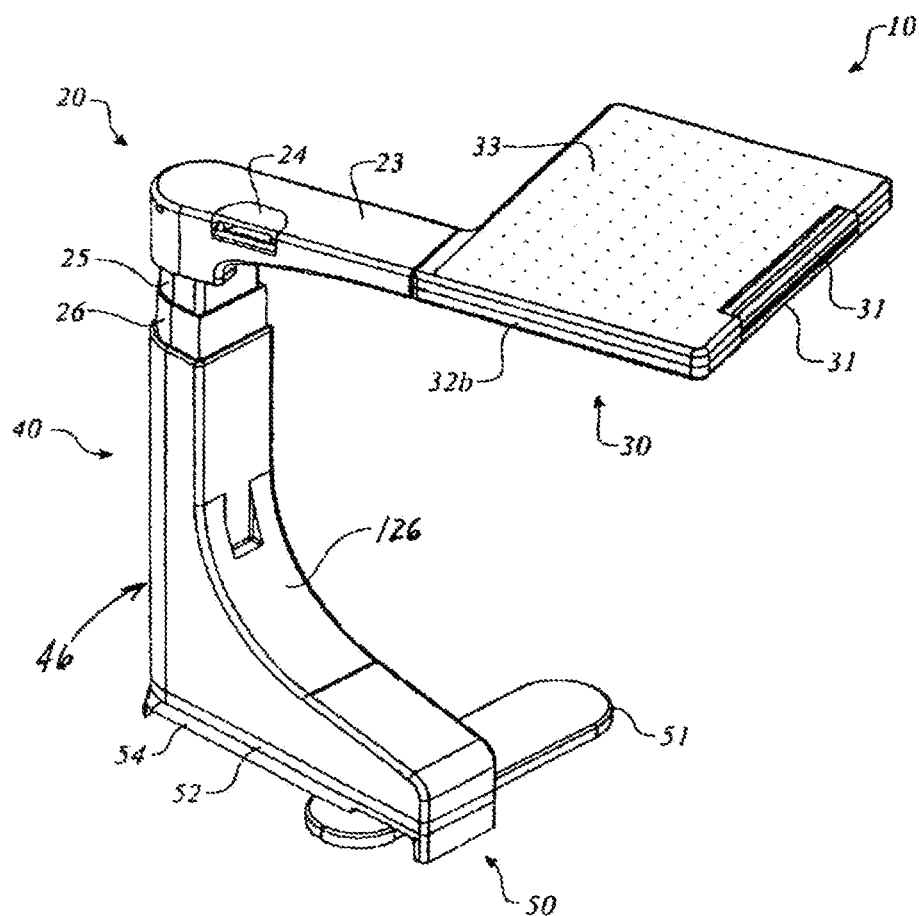
FIG. 12 is a perspective view of a desk assembly of a portable collapsible writing desk for a notebook computer showing the rotatable feature of the armrest and desk assembly.

Shown throughout the figures, the present invention is generally directed towards a portable collapsible writing desk for a notebook computer, which functions to overcome the various disadvantages of the fixed student desks.

Referring now to FIGS. 1-12, the portable collapsible writing desk for a notebook computer (collapsible writing desk) 10 preferably includes an arm rest assembly 20, a desktop assembly 30, a column assembly 40 and a base assembly 50. The base assembly 50 is attached to a bottom of the column assembly 40. The arm rest assembly is attached to a top of the column assembly 40. The desktop assembly 30 is moveably retained by the arm rest assembly 20. The collapsible writing desk 10 may rest on the base assembly 50, or rest on an end of the desktop assembly 30 and an edge of the column assembly.

Figure 13:
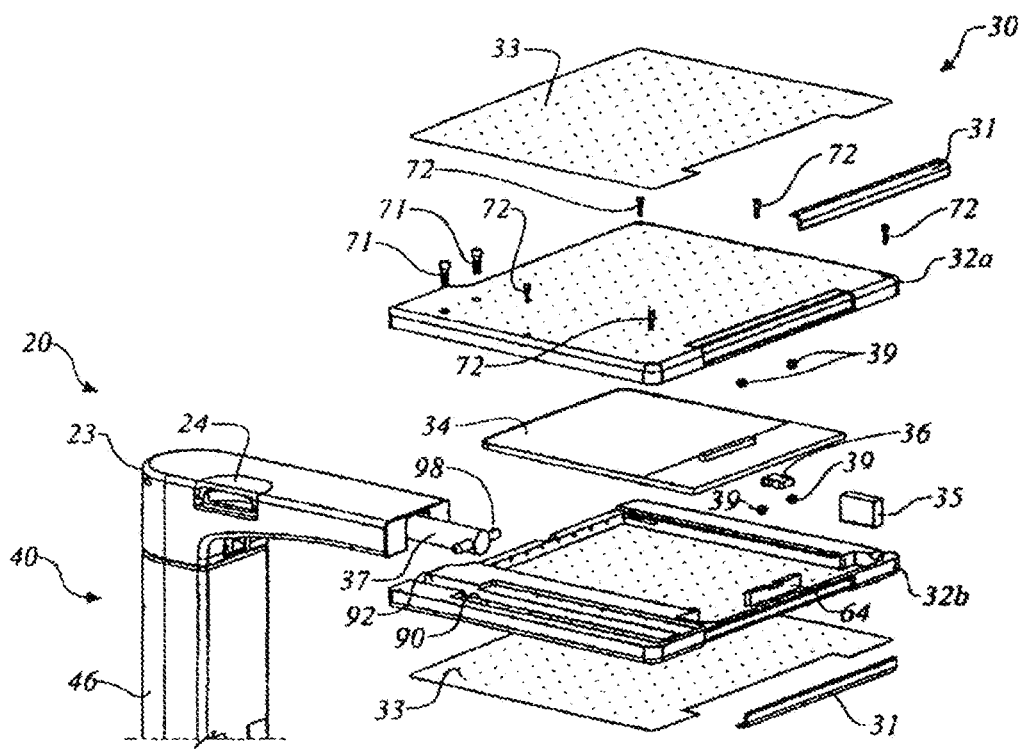
FIG. 13 is a partial exploded view of the desktop assembly of a portable collapsible writing desk for a notebook computer.
Figure 14:
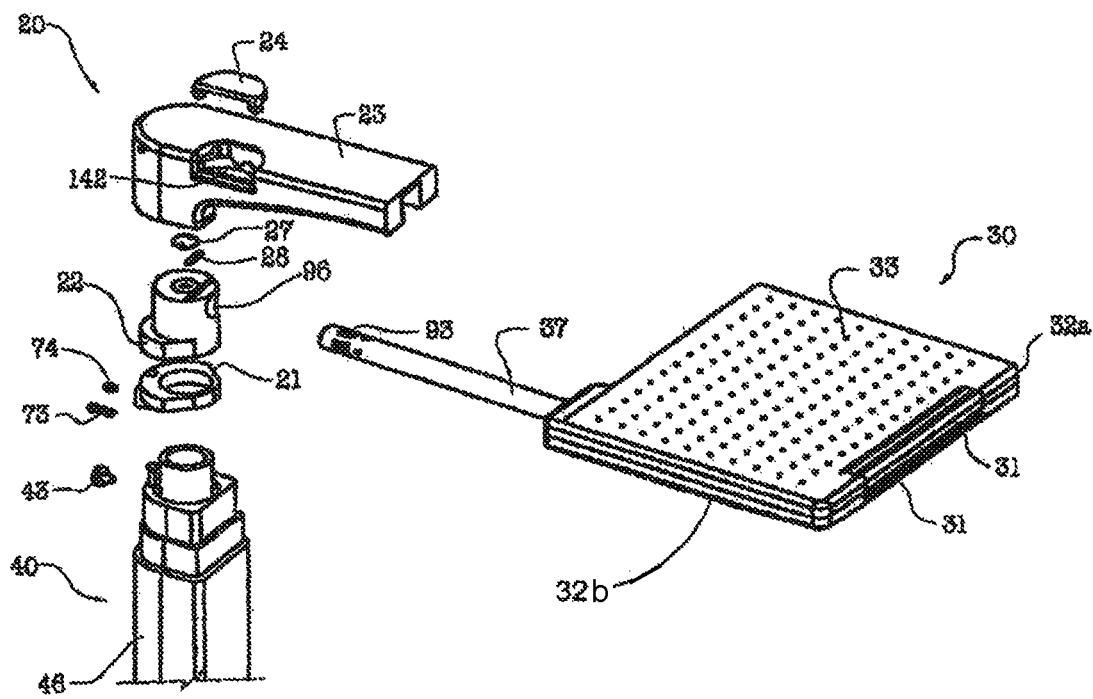
FIG. 14 is an exploded view of an armrest assembly of desk assembly of a portable collapsible writing desk for a notebook computer.
Figure 15:
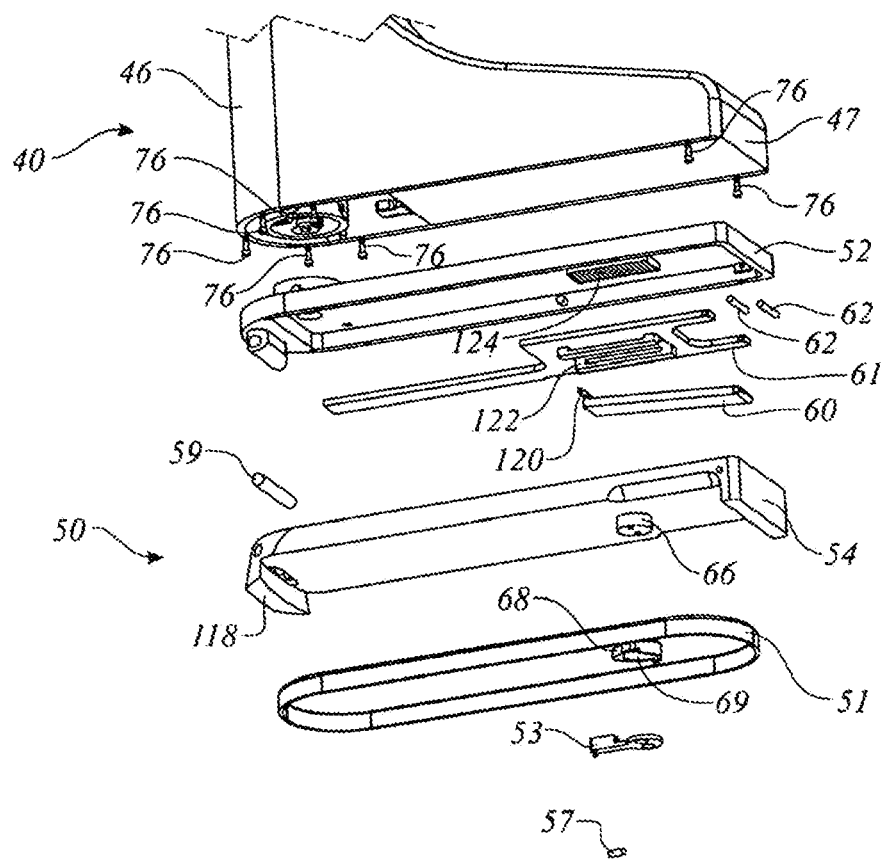
FIG. 15 is an exploded view of the base assembly of desk assembly of a portable collapsible writing desk for a notebook computer.
Figure 16:
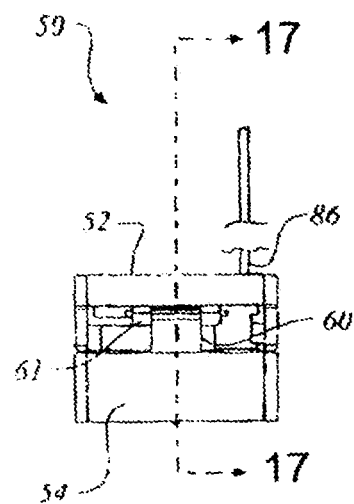
FIG. 16 is a partial schematical front view of the base assembly of desk assembly of a portable collapsible writing desk for a notebook computer.
Figure 17:
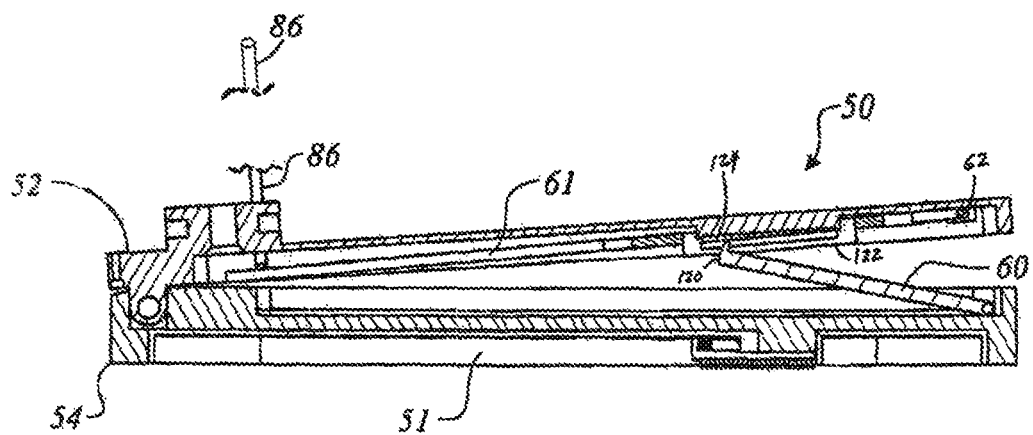
FIG. 17 is a cross-sectional view taken along line 17-17 of FIG. 16.
Figure 18:
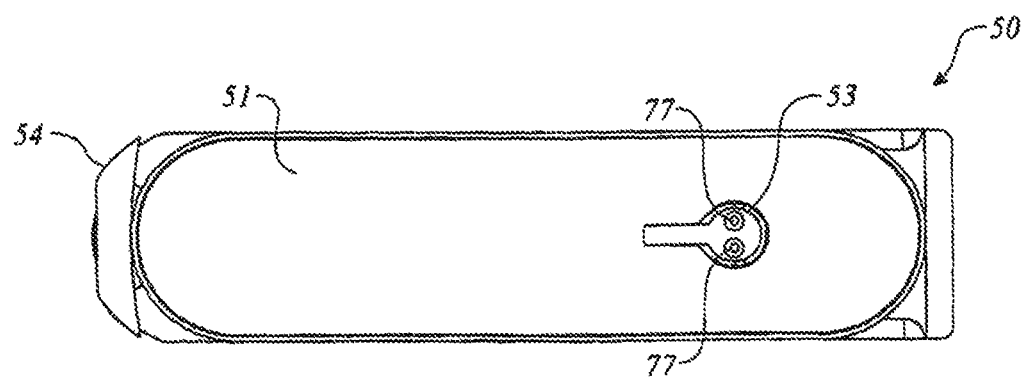
FIG. 18 is a bottom view of the base assembly of desk assembly of a portable collapsible writing desk for a notebook computer.
Figure 19:
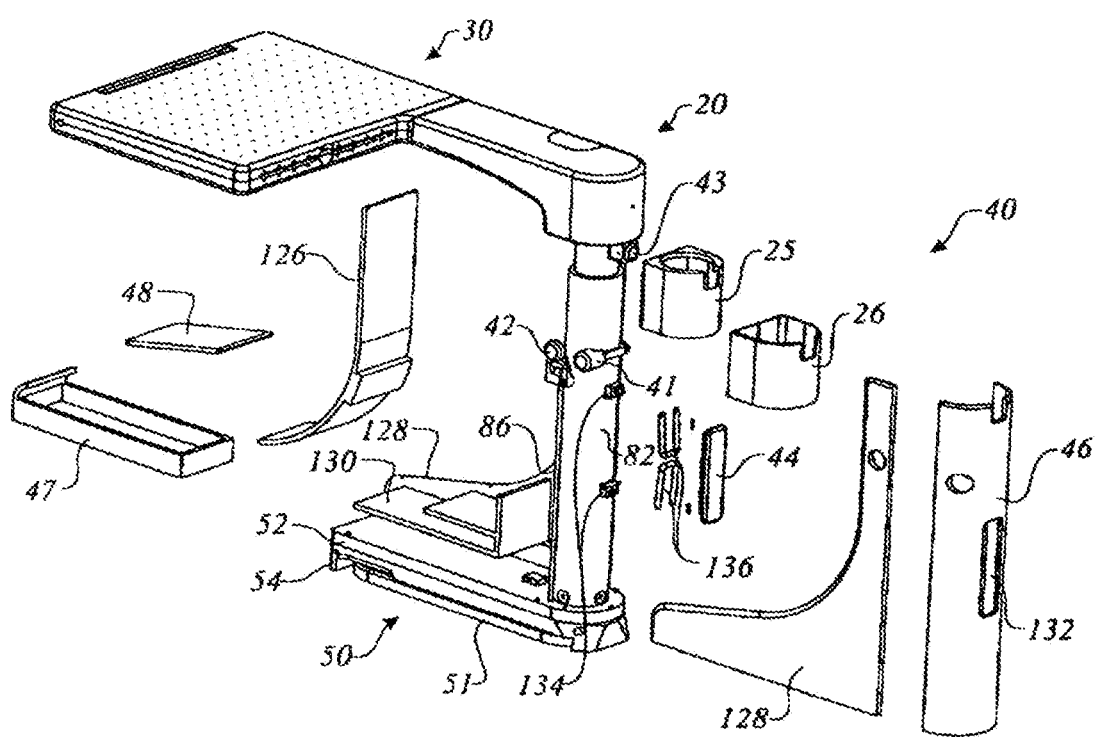
FIG. 19 is an exploded view of the column assembly of a portable collapsible writing desk for a notebook computer.
Figure 20:
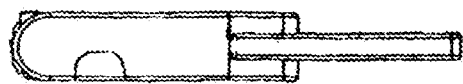
FIG. 20 is a top view of the desktop assembly in a vertical position of a portable collapsible writing desk for a notebook computer.
Figure 21:
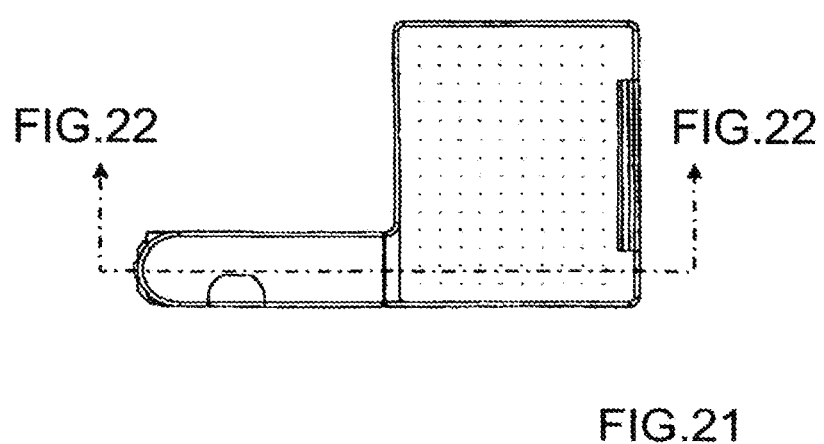
FIG. 21 is a top view of the desktop assembly in a horizontal position of a portable collapsible writing desk for a notebook computer.
Figure 22:
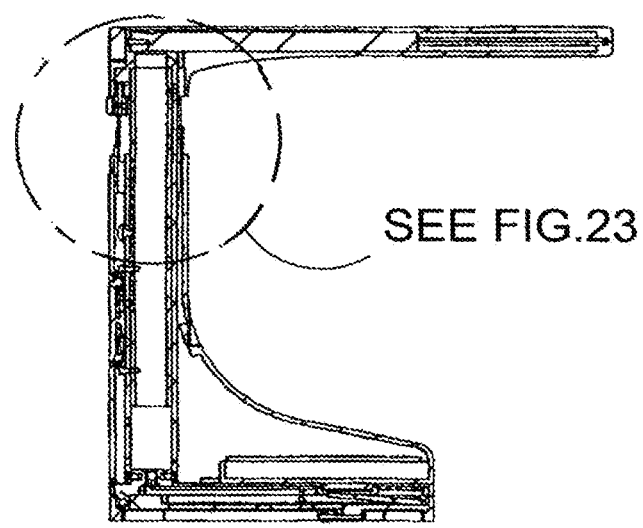
FIG. 22 is a cross sectional view of a desk taken along lines 22-22 from FIG. 21.
Figure 23:
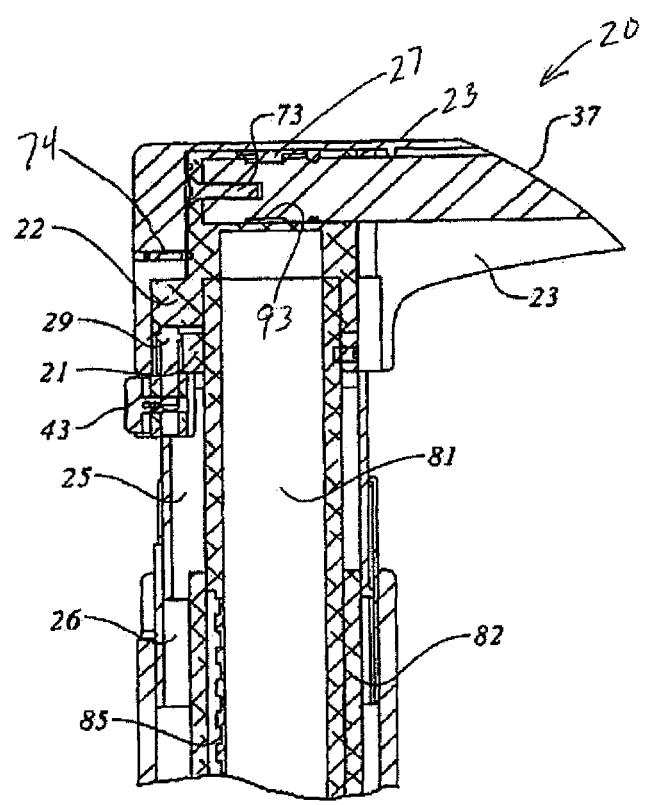
FIG. 23 is an enlarged cross-section view of a desk assembly shown generally by the circle in FIG. 22.
Figure 24:
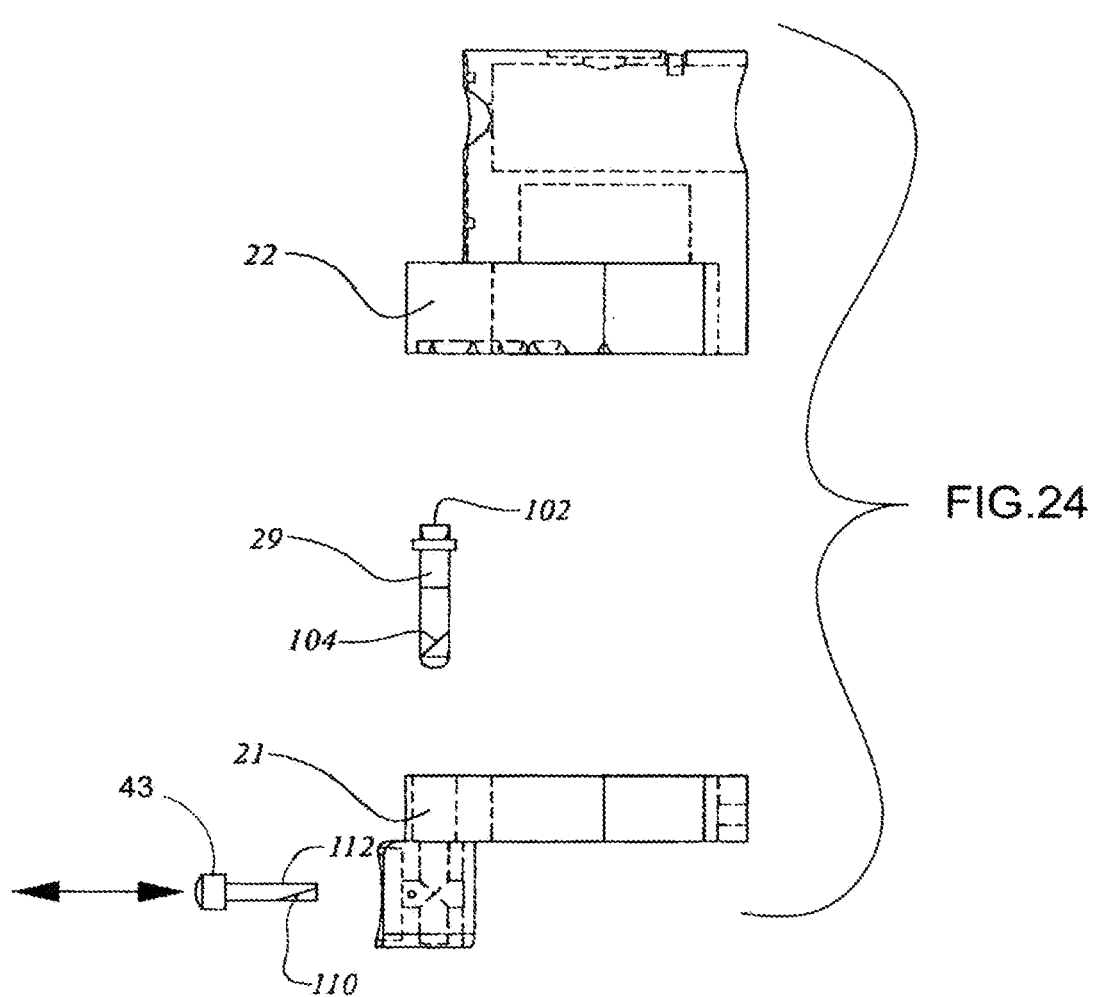
FIG. 24 is an exploded side view of the general region of the upper portion of the column assembly as it intersects the rear portion of the armrest assembly of a portable collapsible writing desk for a notebook computer.
Figure 25:
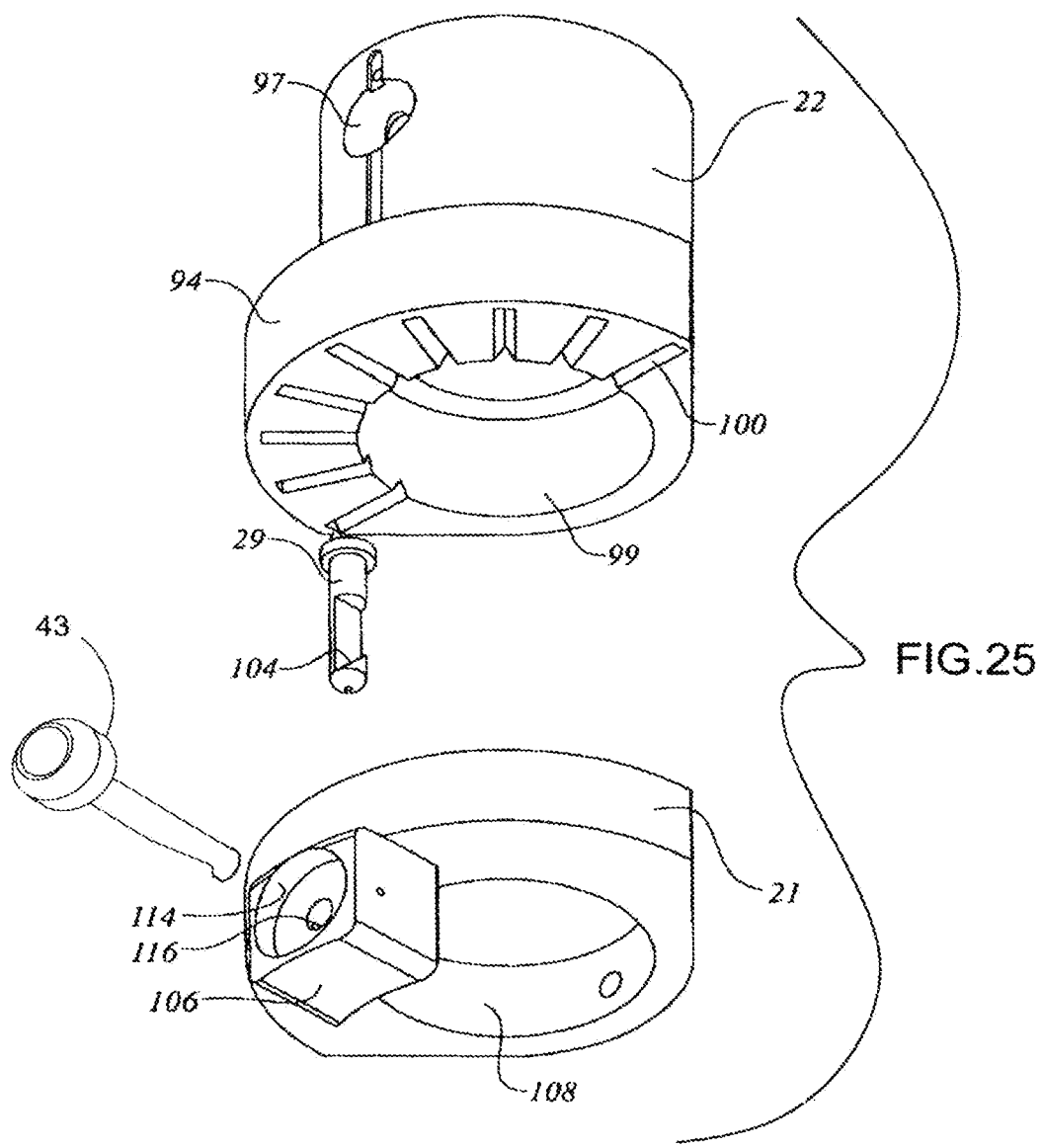
FIG. 25 is an exploded perspective view of the general region of the upper portion of the column assembly as it intersects the rear portion of the armrest assembly of a portable collapsible writing desk for a notebook computer.

Referring briefly to FIG. 13 and FIG. 14, the desktop assembly 30 includes a first housing member 32a, a second housing member 32b, two surface pads 33 and a writing tablet 34. The second housing member 32b is a mirror image of the first housing member 32a. A plurality of holes are formed through the first housing member 32a, the second housing member 32b and the two surface pads 33 to provide air flow from an internal fan 35. The internal fan 35 is retained between the first and second housing members. The internal fan 35 is supplied with electrical power through a battery or the like (not shown). The air flow is used to cool a notebook computer placed on the desktop assembly 30. A single surface pad 33 is secured to a top of the first housing member 32a and a bottom of the second housing member 32b. The two surface pads 33 are preferably fabricated from a sticky nonskid rubberized material. The nonskid surface of the two the surface pads 33 prevents a notebook computer from sliding or moving when placed on the desktop assembly 30. FIG. 14 shows the desktop assembly 30.

The writing tablet 34 is slidably retained between the first and second housing members. The writing tablet 34 may also be used as a mouse pad, to support an electronic writing tablet or to support an input device for a notebook computer. A stop plate 64 extends from an end of one of the first and second housing members. The stop plate 64 is fabricated from a magnetic material. A magnet push latch 36 is attached of an end of the writing tablet 34. The stop plate 64 and the magnet push latch 36 prevent the writing tablet 34 from sliding out of the desktop assembly 30.

A paper clip 31 is preferably retained on an outside edge of the first and second housing members. The paper clip 31 is released by exerting pressure on a forward edge of the desktop assembly 30. The first and second housing members are preferably secured to each other with threaded fasteners 71, 72 and threaded nuts 39. A slide rod cavity 90 and a rod clearance slot 92 are formed in an inside surface of the first and second housing members to receive a sliding rod bearing 37.

Referring briefly to FIGS. 13-FIG. 25 the arm rest assembly 20 includes a hub ring 21, a mounting hub 22, the slide rod bearing 37 and an arm rest member 23. The arm rest member 23 includes a hub bore for receiving the mounting hub 22. The mounting hub 22 is retained in the hub bore with a retention pin 74. A cup holder cavity 142 is formed in the arm rest member 23 to receive a retractable cup holder 24. The mounting hub 22 includes a partial flange 94 formed on a bottom thereof. A rod bore 96 is formed in the mounting hub 22 to rotatably receive one end of the slide rod bearing 37. A plurality of spline slots 93 are formed around a perimeter of the slide rod bearing 37 at the one end of thereof. A spring plate 27 is located on a top of the hub bore and presses a spline pin 28 into one of the plurality of spline slots 93 for preventing the rotation of the slide rod bearing 37 relative to the arm rest member 23.

A fastener countersink 97 is formed in the mounting hub 22 to receive a threaded fastener 73 for axially retaining the slide rod bearing 37 in the rod bore 96. A capture pin 98 is inserted through the other end of the slide rod bearing 37. The slide rod cavity 90 is sized to receive the capture pin 98. A tube counterbore 99 is formed in a bottom of the mounting hub 22 to receive an inner tube of the column assembly 40. A plurality of index grooves 100 are formed in a bottom of the partial flange 94 to receive an index projection 102 of a locking pin 29. The locking pin 29 also includes an inclined edge 104 formed on a bottom thereof.

The hub ring 21 includes a button projection 106 to retain a rotation button 43. A tube bore 108 is formed through the hub ring 21 to receive the inner tube. The rotation button 43 includes an indexing projection 112. An inclined slot 110 is formed in the indexing projection 112 to receive the inclined edge 104. A button counterbore 114 and a projection bore 116 are formed in the button projection 106 to receive the rotation button 43. Pushing the rotation button 43 removes the index projection 102 from one of the plurality of indexing grooves 100 to allow the arm rest assembly 20 to rotate relative to the column assembly 40. Releasing the rotation button 43 locks the arm rest assembly 20 relative to the column assembly 40.

Referring briefly to FIGS. 16-19, the base assembly 50 includes a stabilizer member 51, a pivoting member 52, a base member 54, a ratchet 60 and a ratchet plate 61. The pivoting member 52 is attached to a bottom of the column assembly 40 with a plurality of threaded fasteners 76. One end of the pivoting member 52 is pivotally secured to a first end of the base member 54 with a pivot pin 59. A tube boss extends from a top of the pivoting member 52 at a first end thereof. An outer perimeter of the tube boss is sized to receive an inner perimeter of an outer tube 82 of the column assembly 40. A pair of opposing feet 118 extends from a bottom of the base member 54 to provide clearance for the stabilizing member 51.

The stabilizing member 51 is pivotally retained on a bottom of the base member 54. A pivot boss 66 is formed on a bottom of the base member 54. A cam surface 68 is formed on a bottom of the stabilizing member 51. A boss bore 69 is formed through the cam surface 68 to receive the pivot boss 66. A pivot arm 53 is attached to the pivot boss 66 with two fasteners 77. A spring plunger is 57 is retained in the pivot arm 53 to ride against the cam surface 68 and thus maintain the stabilizing member 51 parallel to the base member 54 or perpendicular to the base member.

A first end of a ratchet plate 61 is pivotally attached to the pivoting member 52 with a pair of pivot pins 62. A ratchet 60 includes a ratchet projection 120 formed on a first end that extends from opposing sides thereof. A second end of the ratchet 60 is pivotally secured to a second end of the base member 54. A pair of guide loops 122 extend from a bottom of the ratchet plate 61. The pair of guide loops 122 are sized to receive and retain the ratchet projection 120. A top of the ratchet projection 120 engages a ratchet surface 124 formed on a bottom of the pivoting member 52, adjacent the pair of guide loops 122.

Referring briefly to FIGS. 10 and 20-25, the column assembly includes a column assembly 40 includes the inner tube 81, the outer tube 82, a first end cover member 46, a second end cover member 126 and a pair of side plates 128. The base member 54 is attached to a bottom of the first end cover plate 46 and the pair of side plates 128 with the plurality of threaded fasteners 76. A drawer slide 130 is retained between the pair of side plates 128. The drawer slide 130 slidably retains a drawer 47. A battery cover 48 is removably retained between the first and second side plates 128.

A handle opening 132 is formed through the first end cover member 46. A pair of handle lugs 134 are attached to an outside wall of the outer tube 82. A pair of handle extensions 136 are looped through a handle 44 and engaged with the pair of handle lugs 134. An inner spacer 25 includes an inner perimeter for firmly receiving an outer perimeter of the inner tube. An outer spacer 26 includes an inner perimeter for slidably receiving an outer perimeter of the inner spacer 25. An inner perimeter of the first end cover member 46, the second end cover member 126 and the pair of side plates 128 at a top thereof are sized to receive an outer perimeter of the outer spacer 26.

A plurality of height adjustment steps 85 are formed on an outer perimeter of the inner tube. A height control button 41 is retained in a side wall of the outer tube 82. Depressing the height control button 41 and lifting the armrest assembly 20 affects the vertical height adjustment of the armrest assembly 20.

An inclination button 42 is retained on the outer tube 82. Depressing the inclination button 42 causes a control rod 86 to move in a downward movement. The downward movement of the control rod 86 pushes the ratchet plate 61, which in turn releases the ratchet 60. Releasing the inclination button 42 raises the control rod 86 and reengages the ratchet 60 with the ratchet plate 61, locking further inclination movements.

Since many modifications, variations, and changes in detail can be made to the described preferred embodiments of the invention, it is intended that all matters in the foregoing description and shown in the accompanying drawings be interpreted as illustrative and not in a limiting sense.

I claim:

1. A portable collapsible writing desk comprising:
   a base;
   an armrest spaced apart from said base, said armrest having a planar surface for supporting a user's arm thereon;
   a column connecting said base to said armrest;
   said armrest being a cantilever with a first end affixed on said column and a second free end opposite said first end;
   a desktop having a vertical desktop extended position, said desktop having a horizontal position with an outer surface of said desktop defining a desk working surface, said outer surface being substantially level with said planar surface et said armrest;
   said desktop being linearly slidable along said armrest from said vertical desktop extended position to a desktop nesting position in which said desktop is disposed directly underneath said armrest and between said base and said armrest.

2. A portable collapsible writing desk comprising:
a base;
an armrest spaced apart from said base, said armrest having a planar surface;
a column connecting said base to said armrest;
said armrest being a cantilever with a first end affixed on said column and a second free end opposite said first end;
a desktop having a trailing edge and a leading edge relative to an extension direction of said desktop, said desktop having a vertical desktop extended position in which said trailing edge is extended beyond said second free end of said armrest, said desktop having a horizontal position with an outer surface of said desktop being substantially level with said planar surface of said armrest and said trailing edge adjacent said second tree end;
said desktop being linearly slidable along said armrest from said vertical desktop extended position to a desktop nesting position in which said desktop is disposed directly underneath said armrest and between said base and said armrest with said trailing edge adjacent said column.

* * * * *